A. LARSEN.
HOOF PAD.
APPLICATION FILED APR. 5, 1913.
1,135,029. Patented Apr. 13, 1915.
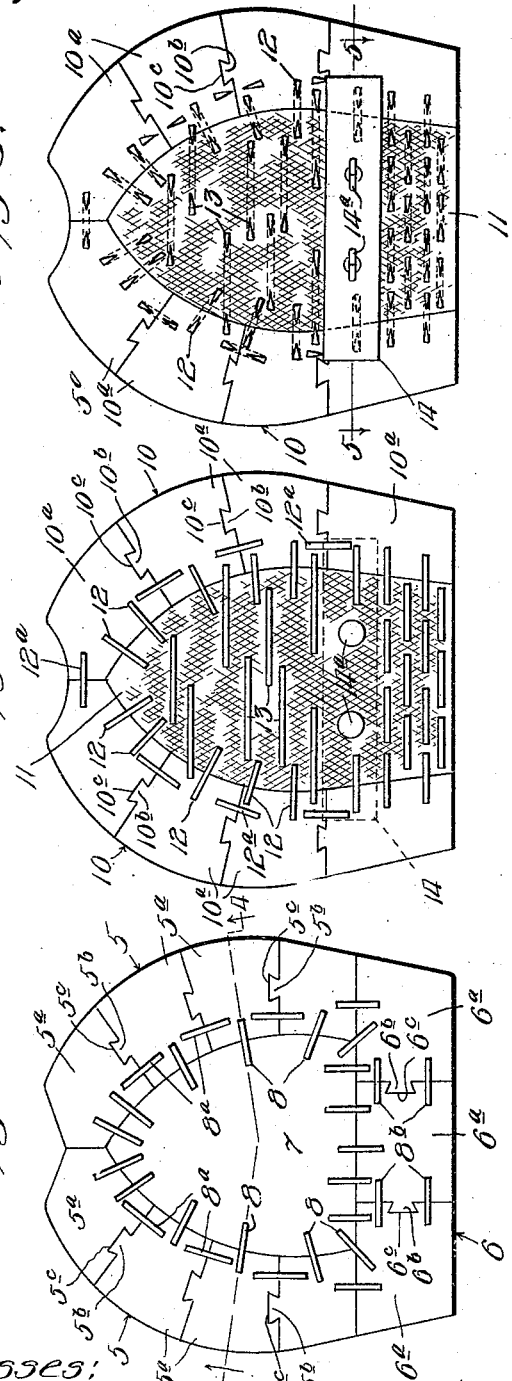
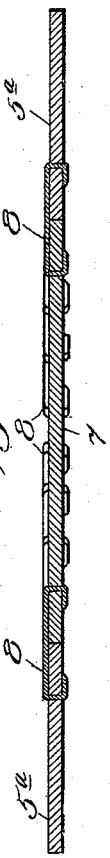
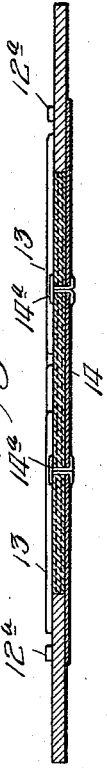
Inventor
Andru Larsen.

UNITED STATES PATENT OFFICE.

ANDRU LARSEN, OF CHICAGO, ILLINOIS.

HOOF-PAD.

1,135,029.
Specification of Letters Patent.
Patented Apr. 13, 1915.

Application filed April 5, 1913. Serial No. 759,001.

*To all whom it may concern:*

Be it known that I, ANDRU LARSEN, a citizen of the United States, and a resident of Chicago, in the county of Cook and State of Illinois, have invented certain new and useful Improvements in Hoof-Pads; and I do hereby declare that the following is a full, clear, and exact description thereof, reference being had to the accompanying drawings, and to the letters of reference marked thereon, which form a part of this specification.

This invention relates to hoof pads adapted for insertion between a horse shoe and the hoof of the horse, of that class comprising a rim member of flexible material conforming generally to the shape of the shoe and a center member joined at its margins to the rim member and adapted to cover or protect the frog and other parts of the hoof that are not covered or protected by the shoe.

A hoof pad embodying my invention has its center member made of flexible material and arranged in the same plane with the rim member and secured thereto with its margins in abutting relation to the inner margins of the rim member.

My invention also includes additional features of construction by which the rim member consists of a plurality of pieces or sections joined to each other, edge to edge, and by which the center member, so made of flexible material, is strengthened, stiffened and given greater durability by a plurality of separate metal stiffening members applied or secured thereto.

The invention consists in the matters hereinafter described and pointed out in the appended claims.

As shown in the accompanying drawings Figure 1 is a face view of a hoof pad embodying one form of my invention; Fig. 2 is a view of a like pad differing in its details of construction from that shown in Fig. 1; Fig. 3 is a view of the reverse side of the pad shown in Fig. 2; Fig. 4 is a sectional view of the pad shown in Fig. 1, taken on line 4—4 of said Fig. 1; Fig. 5 is a sectional view of the pad shown in Figs. 2 and 3, taken on line 5—5 of Fig. 3.

Referring first to the form of pad shown in Figs. 1 and 4, the same consists of two lateral, curved rim members 5, 5, a transversely extending heel member 6, and a center member 7. The rim members 5, 5, and heel member 6 are made of leather, and the center member 7 of leather or of a fabric consisting of layers of cloth joined to each other by rubber or other waterproof adhesive material. The said rim members 5, 5, the heel member 6, and the center member 7 are arranged in the same plane with their meeting edges in abutting relation. For joining the center member to the rim members and heel member, when thus arranged in relation to each other, I employ a plurality of metal staples 8, 8, 8, the body portions of which extend across the meeting edges of the joined parts, and the points of which are inserted through such parts from one side thereof and clenched on the other side thereof. As a further improvement, as shown in Fig. 1, each curved rim member 5, consists of a plurality of pieces or sections $5^a$, $5^a$, joined to each other, edge to edge, in abutting relation. As a means of joining said sections $5^a$, $5^a$, metal staples $8^a$, $8^a$, are employed, which are inserted through the adjacent marginal parts of adjoining sections with their body portions extending across the meeting edges of the sections at one side thereof and their points clenched on the opposite side thereof. The said staples $8^a$ are arranged adjacent to the inner margins of the members 5, 5, and inside of the portions of the rim against which the horse shoe rests, so that the presence of said staples will not interfere with the cushioning action of the rim. As a further means of joining said sections $5^a$, $5^a$, each of the sections is shown as provided with a dovetailed tongue $5^b$, which fits within a correspondingly shaped notch $5^c$ formed in the adjacent section. In the case of the transversely extending heel member 6, the same is also shown as consisting of a plurality of pieces or sections $6^a$, $6^a$, made of leather, joined to each other by staples $8^b$, $8^b$, and provided with dovetailed tongues $6^b$, which fit within notches $6^c$ of adjacent sections. An important advantage is gained by making the lateral members 5, 5 of the rim and the heel member 6, of a plurality of joined pieces or sections of leather, as described, for the reason that by reason of the high cost of leather, a rim thus constructed may be made of small pieces of leather of the requisite thickness, and therefore at much less expense than is involved in making said side members each of a single larger piece of thick leather.

In the form of pad shown in Figs. 2, 3 and 5, the rim thereof consists of two side members 10, 10, while the center member thereof consists of a single piece of flexible material 11. In this instance, the side members 10, 10, extend to the rear margin of the pad, as does also the center member 11; the transverse leather heel piece in this instance being omitted and the rear ends of the side members 10, 10, which come beneath the rear ends of the shoe, taking the place of the end portions and said transverse heel piece, shown in Fig. 1. The center member 11 is arranged in the same plane with the rim members 10, 10 and is joined thereto at its edges by means of staples 12, 12, arranged in the same manner as the staples 8 previously described. As shown in said Figs. 2 and 3, moreover, each rim member 10 consists of a plurality of sections 10ª, 10ª, joined by staples 12ª and provided with interlocking dovetailed tongues and notches 10ᵇ, 10ᶜ, as before described, in connection with Fig. 1. The center piece 11 made of flexible material, such as leather or rubber fabric, has advantages over the metal plates heretofore commonly used to protect the bottom part of the hoof within the horse shoe, because of the fact that it readily adjusts itself to the irregularities of the hoof and shoe, but a center piece of such flexible material is frequently lacking in sufficient stiffness to properly protect the frog and central part of the hoof. I have, therefore, provided stiffening means for the center member 11, consisting of a plurality of separate, elongated metal stiffening members 13, 13, which are applied or secured to the center member 11. Said members 13, 13 are spaced apart or separated from each other, so as to increase the stiffness and durability of the center member, while leaving a considerable degree of flexibility therein. As shown, each of said stiffening members 13 consists of a staple, the body of which is elongated and the points of which are inserted through the material of the member and clenched on the opposite side thereof. As shown, these stiffening members extend transversely of the center member 11, but this may be otherwise arranged so far as the main or forward part of the same is concerned. The stiffening members 13, 13, applied to the rear marginal part of the center member, are arranged parallel with the rear edge of the said center member, and parallel with each other, so as to give a considerable degree of stiffening effect to the part of the said center member which extends between the rear ends of the shoe. As a further means of stiffening the center member 11, a strip 14, of sheet metal, is applied thereto in position to extend across the same, forward of its rear margin. The said strip 14 is shown as secured to the center member by means of rivets 14ª, 14ª, and its ends extend beyond the side margins of the center member, so as to overlap the rim members 10, 10. The ends of said strip, when the shoe is applied, extend partially between the shoe and the marginal part of the hoof. The said strip 14, thus arranged, serves to resist any upward pressure on the part of the center member which extends over the frog.

While a hoof pad made as in both forms described, may be applied to the hoof with either of its sides uppermost or in contact with the hoof, yet the form of pad shown in Figs. 2 and 3, will preferably have its side to which the strip 14 is applied, placed uppermost and its side, at which the main or longitudinal parts of the staples 13, 13, are located, placed downwardly toward the ground. In the cases of both forms of pad shown, by the placing of the pad on the hoof with its side, at which the central or body parts of the staples are located, downward or toward the ground, the advantage is gained that said staple members will act more effectively to resist the wear coming on the central part of the pad, by reason of its contact with stones or other objects.

A hoof pad embodying the several features of my invention may be varied in the form of its component parts and in the details of its construction, and I do not desire to be limited to the specific features shown in the drawings, except as pointed out in the appended claims.

I claim as my invention—

1. A hoof pad adapted to be interposed between the hoof of a horse and the shoe, said pad comprising a rim member made of flexible material and of the general contour of the shoe, a center member made of flexible material and having all portions thereof in the same plane with said rim member, the lateral edges of said center member abutting against the inner lateral edges of said rim member, and fastening members for securing said rim and center members together.

2. A hoof pad adapted to be interposed between the hoof of a horse and the shoe, said pad comprising a rim member made of flexible material and of the general contour of the shoe, a center member made of flexible material and having all portions thereof in the same plane with said rim member, the lateral edges of said center member abutting against the inner lateral edges of said rim member, and pronged metal fasteners or staples inserted through and joining said rim and center members together; the body portions of each metal fastener extending across the meeting edges of said members.

3. A hoof-pad adapted to be interposed between the hoof of a horse and the shoe, said pad comprising a rim member made of flexible material and of the general contour of the shoe, a transverse heel member made of flexible material and arranged in the same plane with said rim member and having the end portions of its inner longitudinal edge abutting against the end edges of said rim member, a center member made of flexible material and arranged in the same plane with said rim and heel members and having its edges abutting against the adjacent inner edges of said rim and heel members, and metal fasteners inserted through and joining said members together.

4. A hoof-pad adapted to be interposed between the hoof of a horse and the shoe, said pad comprising a rim member embracing two side portions of the general contour of the shoe, and each side portion constituting a half of the rim member, each side portion consisting of a plurality of pieces or sections which meet each other edge to edge and arranged in the same plane with each other, fastening members inserted through and joining the sections of each side portion together, a center member arranged in the same plane with said rim member with its lateral edges abutting against the inner lateral edges of said rim members, and fastening members joining said rim and center members together.

5. A hoof-pad adapted to be interposed between the hoof of a horse and the shoe, said pad comprising a rim member embracing two side members of the general contour of the shoe, and each side portion constituting a half of the rim member, each side portion consisting of a plurality of pieces of sections which meet each other edge to edge and arranged in the same plane with each other, a center member arranged in the same plane with said rim member and having its lateral edges abutting against the inner lateral edges of said rim member, metal staples inserted through and joining said sections, and means for joining said rim and center members together.

6. A hoof-pad adapted to be interposed between the hoof of a horse and the shoe, said pad comprising a rim member embracing two side portions of the general contour of the shoe, and each side portion constituting a half of the rim member, each side portion consisting of a plurality of pieces or sections which meet each other edge to edge and arranged in the same plane with each other, said sections having on their abutting edges interfitting notches and projections, metal staples inserted through and joining said sections together, a center member arranged in the same plane with said rim member and having its lateral edges abutting against the inner lateral edges of said rim member, a heel member arranged in the same plane with said rim and center members with the inner longitudinal edge of said heel member abutting against the adjacent edges of said rim and center members, and metal staples inserted through and joining said rim, center and heel members together.

7. A hoof-pad adapted to be interposed between the hoof of a horse and the shoe, said pad comprising a rim member made of flexible material and of the general contour of the shoe, a center member made of flexible material and arranged in the same plane with said rim member with the lateral edges of said center member abutting against the inner lateral edges of said rim member, fastening means for securing said rim and center members together, and stiffening members applied to said center member, each consisting of a metal staple, the points of which are inserted upward through said center member and clenched upon the upper surface thereof, the body portion of said staple extending over the lower surface of said center member.

8. A hoof pad comprising a rim and a center member, both made of flexible material, said members being arranged in the same plane and joined with their meeting edges in abutting relation, and a flat, transverse, metal stiffening strip, secured to the center member and overlapping the rim at its ends.

9. A hoof pad comprising a rim and a center member, both made of flexible material, said members being arranged in the same plane and joined with their meeting edges in abutting relation, a plurality of separate stiffening members applied to said center member, each consisting of a metal staple, the prongs of which are inserted through and clenched upon said center member, and a flat, transverse, metal stiffening strip attached to said center member, and extending at its ends over said rim.

In testimony, that I claim the foregoing as my invention I affix my signature in the presence of two witnesses, this 31st day of March A. D. 1913.

ANDRU LARSEN.

Witnesses:
EUGENE C. WANN,
M. F. ANTHONY.

Copies of this patent may be obtained for five cents each, by addressing the "Commissioner of Patents, Washington, D. C."